UNITED STATES PATENT OFFICE.

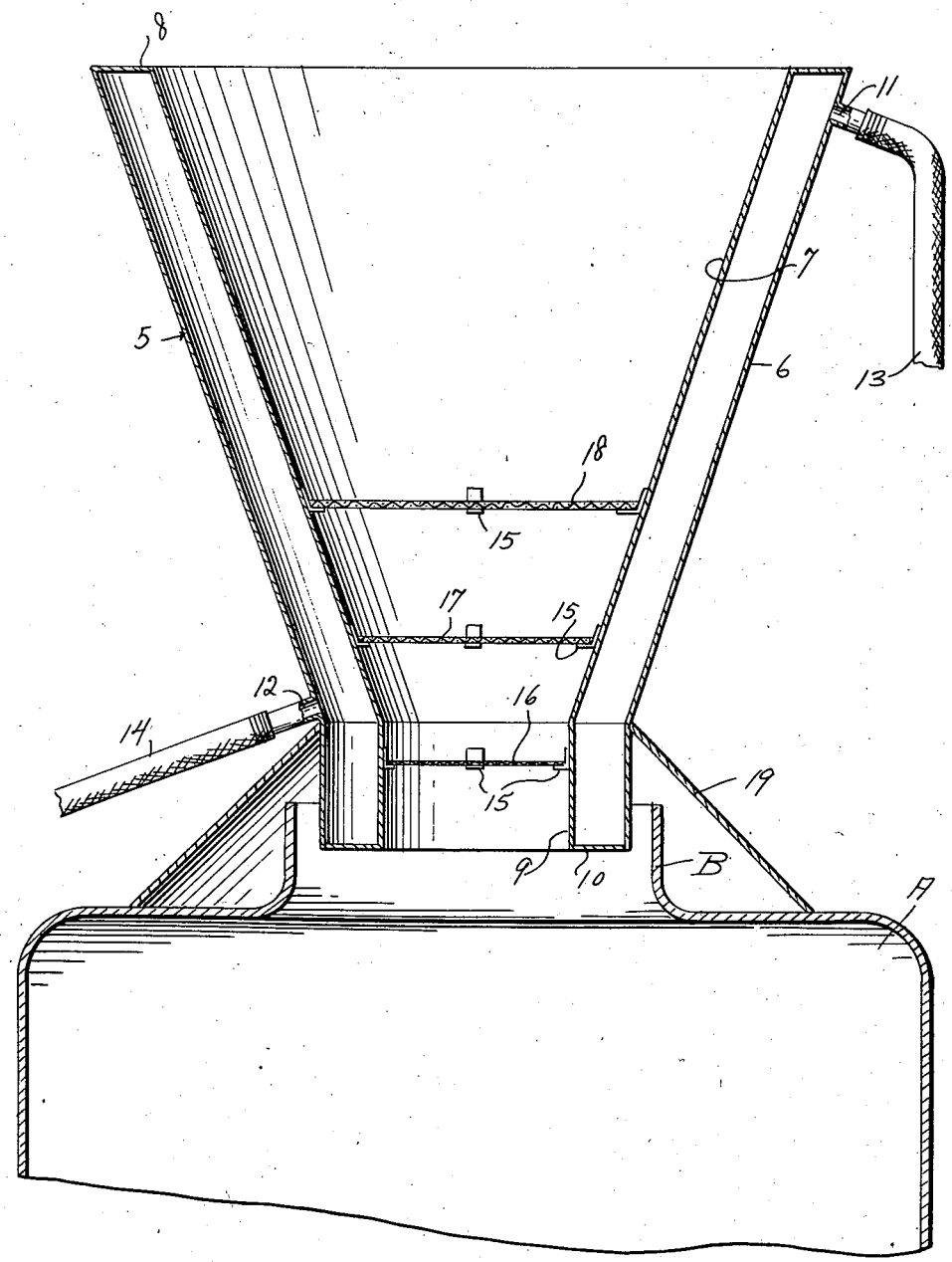

HENRY EARNEST LEECH, OF LIVE OAK, FLORIDA.

STRAINER.

1,351,293.  Specification of Letters Patent.  Patented Aug. 31, 1920.

Application filed November 19, 1919. Serial No. 339,007.

*To all whom it may concern:*

Be it known that I, HENRY EARNEST LEECH, citizen of the United States, residing at Live Oak, in the county of Suwanee and State of Florida, have invented certain new and useful Improvements in Strainers, of which the following is a specification, reference being had to the accompanying drawings.

This invention relates to strainers and particularly to a strainer for separating foreign matter from a liquid or a solid substance and has for its object to provide a device of this character which includes means for the fusion of substances such as turpentine and gum to cause the same to lose the foreign particles therein while passing through the device to the strainer.

Another object is the provision of a device of this character which returns the heat, after its circulation, to its source of supply so as to prevent waste.

Another object is to provide a strainer, one portion of which is surrounded by heat and in which the heat does not directly engage the substances to be strained.

Another object is the provision of a device of this character constructed from sheet metal to include an inner and outer wall arranged to provide a heat chamber.

With these and other objects in view the invention consists in the improved construction and arrangement of parts to be hereinafter more particularly described, fully claimed and illustrated in the accompanying drawings, in which:—

The figure is a vertical elevated sectional view of a strainer constructed in accordance with an embodiment of the invention.

Referring to the drawings, A designates a receiving receptacle such as a steel kettle including a neck B adapted to receive one end of the strainer 5. The strainer consists of a frusto-conical member including an outer wall 6 and an inner wall 7, the upper portions of the walls 6 and 7 being formed integral to provide an upper wall 8. The lower end of the inner wall 7 extends downward as at 9 and has its extremity bent inwardly and connected to the lower end of the wall 6 to provide a lower wall 10. By the coöperation of the walls 6 and 7 and the walls 8 and 10 an annular chamber is formed which surrounds the inner wall 7. This chamber is intended to receive heat such as steam through an inlet 11 located adjacent the upper end of the wall 6, the steam circulating around the inner wall 7 within the chamber and leaving the same through the outlet 12. The steam is received from a boiler by means of the conduit 13 and after use is returned by means of the conduit 14 connected to the outlet 12. By this means steam is not wasted.

A plurality of brackets 15 are secured to the inner wall 7 at its lower portion, the brackets being disposed in rows, one above the other in spaced relation thereto. The lower row of brackets are situated adjacent the lower extremity of the inner wall and are intended to support a strainer 16 of small mesh. The next row of brackets are arranged to support a strainer 17 of medium mesh, while the row of brackets above the medium meshed strainer support a strainer 18 of relatively large mesh. The lower end of the strainer 5, is provided with an annular downwardly tapering stand 19 adapted to engage the upper portion of the receptacle A so as to hold the lower end of the strainer in the neck B.

In the use of the strainer, steam is admitted through the inlet 11 and circulates within the chamber so as to heat the inner wall 7. Turpentine, gum or like substance is then deposited in the strainer and in view of its conical formation the substance is fed down the incline thereof to the lower end. During this movement, the heated inner wall causes the fusion of the substance so as to loosen the foreign particles contained therein and when the substance reaches the strainers, the foreign matter is removed by the three sets of strainers according to the size of said matter so that the substance leaves the strainer in a pure condition, all foreign matter being retained by the strainers. After the steam has circulated within the heating chamber, it leaves the outlet 12 and passes back into the boiler. By the provision of the heating chamber, fusion of the substance is possible without causing the steam to come in direct contact with the substance, the fusion being accomplished as the substance travels through the strainer 5. In addition to this, the outer wall 6 serves to insulate the inner wall from the atmosphere so that the heat of the inner wall is retained, thereby causing rapid fusion of the substance.

From the foregoing it will be readily seen that this invention provides a novel strainer that can be easily positioned on any receptacle of conventional form and capable of purifying not only liquids, but substances in a semi-solid state such as gum and efficiently removes the foreign substances, so that its utility is unlimited.

What is claimed is:

The combination with a kettle having an enlarged neck, of a strainer comprising a single length of material tapered from the intermediate portion to its ends, one end portion of said length being extended back upon said length in spaced parallel relation to the other end portion to provide a heat chamber, said length being formed into a frustum-conical casing, the ends of said length being connected to each other, heat inlet and outlet ports for said chamber, strainers disposed within the inner casing, an inverted frustum-conical stand connected to the outer surface of the heating chamber adjacent the lower end of the strainer, said stand holding the lower end of the strainer within the neck of the kettle in annular spaced relation thereto and coöperating with the kettle to prevent the escape of heat.

In testimony whereof I hereunto affix my signature.

HENRY EARNEST LEECH.